Patented Oct. 15, 1929

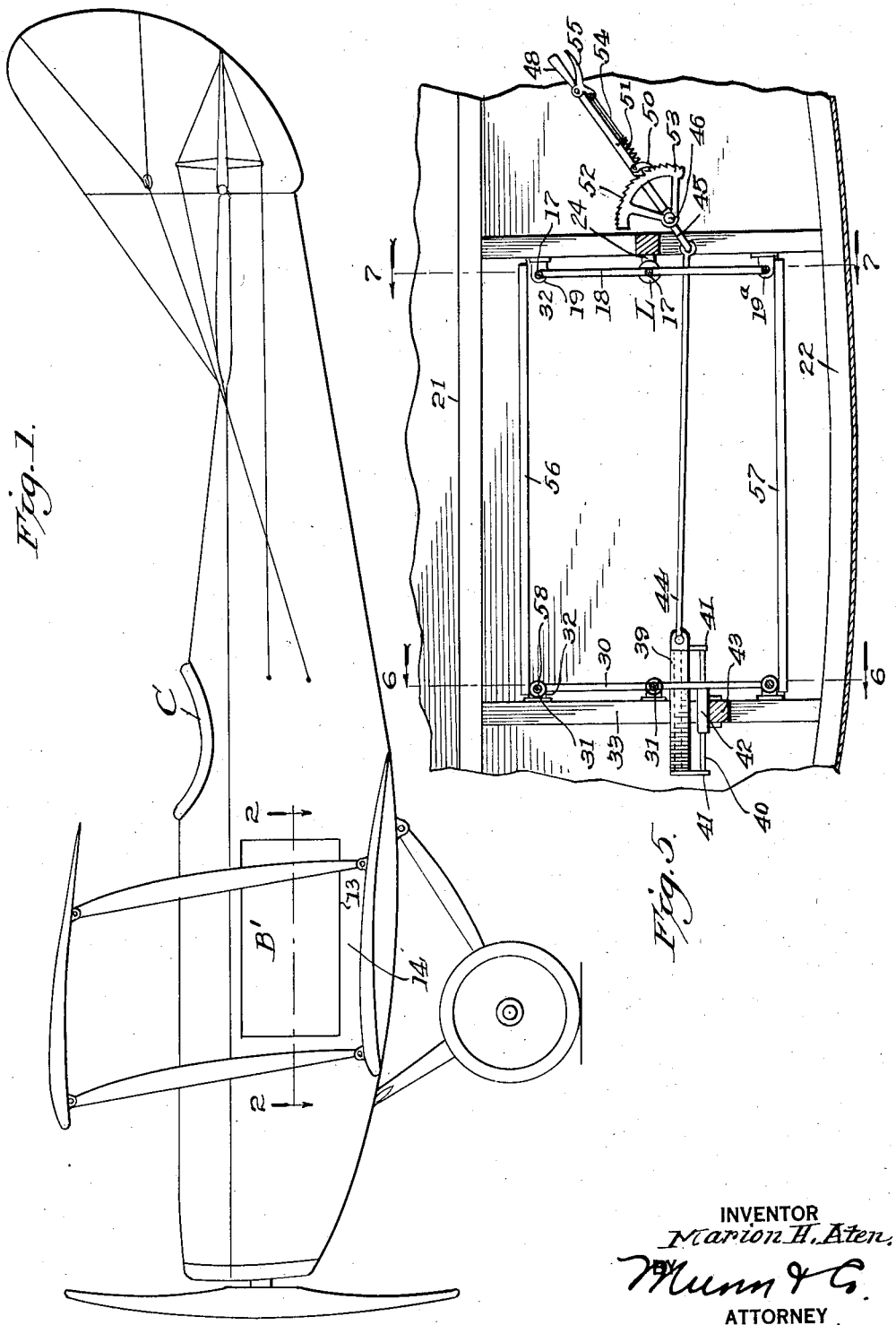

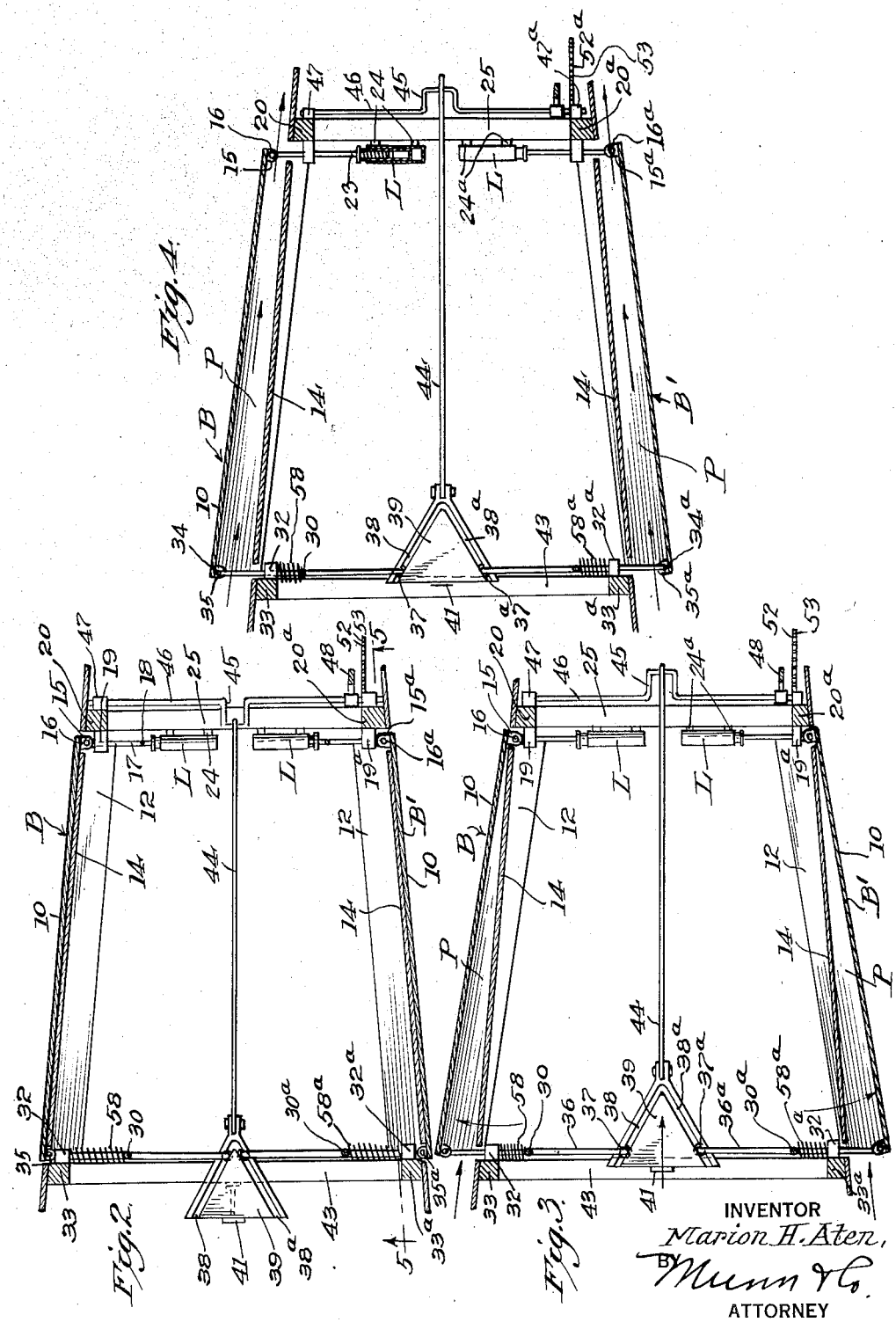

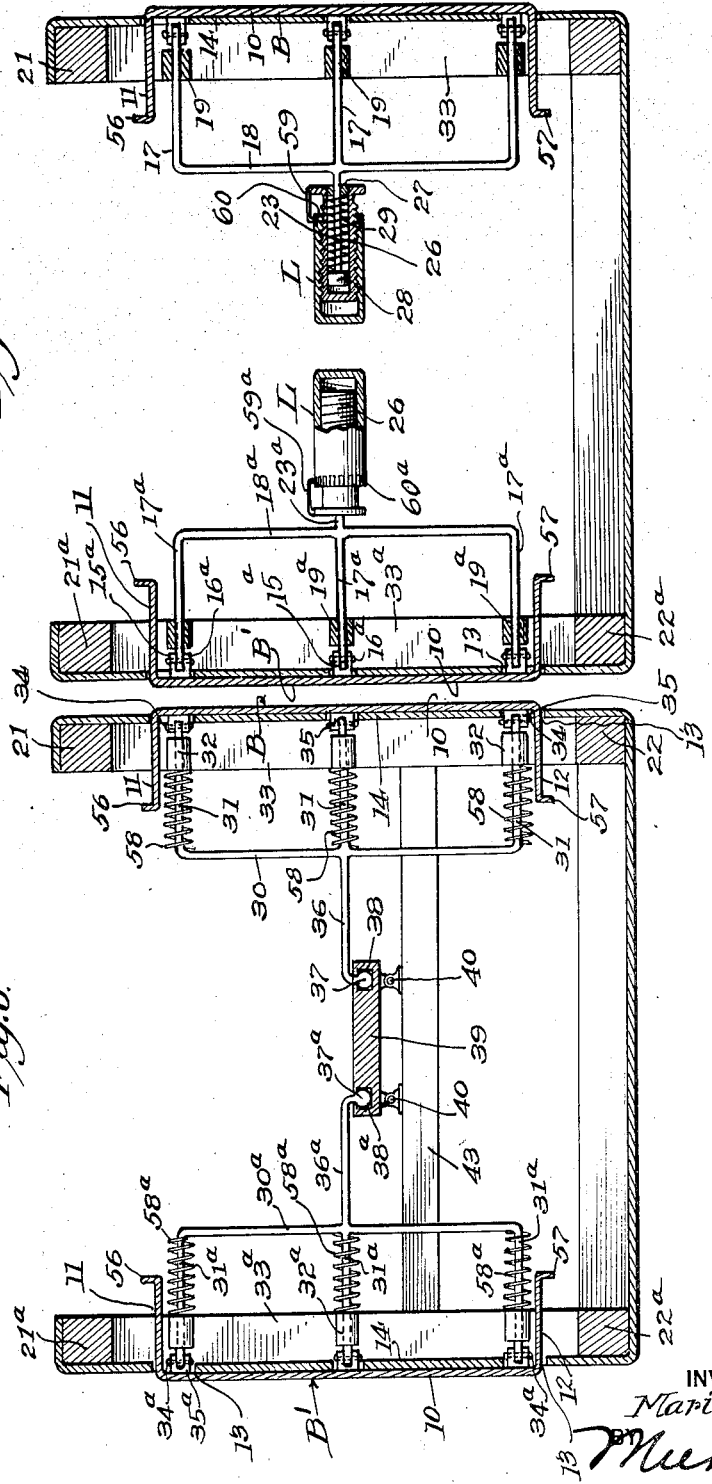

1,731,735

UNITED STATES PATENT OFFICE

MARION H. ATEN, OF EL CENTRO, CALIFORNIA

BRAKING DEVICE FOR AIRCRAFT

Application filed June 12, 1928. Serial No. 284,686.

My invention relates generally to aircraft and more particularly to a simple, substantial, and dependable device therefor by which the speed of the craft when in flight can be smoothly checked with the utmost ease and safety and to such extent that when landing the aircraft, it can be brought to rest in a relatively short distance of travel, thus permitting the craft to be safely landed in a restricted area and as a result eliminating the dangers attendant a forced landing on terrain offering only restricted areas suitable for safely landing the aircraft.

It is a further purpose of my invention to provide a braking device of the above described character which is so located with respect to the center of gravity of the aircraft that when the braking device is in operation it will act automatically to maintain the aircraft in a state of fore and aft balance, with the tail of the aircraft depressed sufficiently to cause the craft to assume and maintain a normal landing position so that the landing operation will be greatly facilitated.

I will describe only one form of braking device for aircraft embodying my invention, and will then point out the novel features in claims.

In the accompanying drawings,

Fig. 1 is a view showing in side elevation a conventional form of aircraft with one embodiment of braking device embodying my invention applied thereto;

Fig. 2 is a sectional view taken on the line 2—2 of Fig. 1 and illustrating the normal or inactive position of my braking device;

Fig. 3 is a view similar to Fig. 2 and showing the braking or active position of my braking device;

Fig. 4 is a view similar to Fig. 2 and illustrating still another position occupied by my braking device;

Fig. 5 is a vertical sectional view taken on the line 5—5 of Fig. 2 and looking in the direction of the arrows; and Figs. 6 and 7 are enlarged sectional views taken respectively on the lines 6—6 and 7—7 of Fig. 5 and looking in the direction of the arrows.

Referring specifically to the drawings in which similar reference characters designate similar parts in each of the several views, my invention is shown associated with a conventional form of heavier than air craft of the biplane type, and in its present embodiment my invention is shown embodied in the fuselage F of the aircraft in advance of the pilot's cockpit C.

My invention in its present embodiment comprises a pair of braking elements or wing members B and B', each of which is constructed of metal or fabric to provide a vertical panel 10 of rectangular outline having its upper and lower longitudinal edges provided with right angularly disposed flanges 11 and 12 respectively extending freely through slots 13 formed in the side walls 14 of the fuselage F, as is shown in Fig. 6.

The rear extremities of the braking elements B and B' are mounted for movement at the outer sides of the fuselage to permit the members to occupy an inactive position shown in Fig. 2 wherein they are contiguous to the outer sides of the fuselage; an active position shown in Fig. 3 wherein they form abutments and co-operate with the side walls 14 of the fuselage to provide wedge shaped pockets P opening forwardly of the aircraft, so that when the latter is in flight, air through which the craft travels will enter the open forward ends of the pockets constituting the inlets of the pockets, and be trapped in the pockets to thus check the speed of the craft; and a relief position shown in Fig. 4 wherein they permit the passage of air through the pockets to discharge from the open rear ends thereof constituting outlets so that the pockets will be ineffective to check the speed of the craft.

The means for mounting one of the braking elements to render it capable of assuming the above described positions is identical to that for the other, so that a description of one means will suffice for both, and to distinguish the parts of one means from those of the other, the reference characters designating the parts of one means are provided with exponents.

To the rear extremity of the vertical panel 10 of the braking element B are secured at points one above the other, a plurality of brackets 15, three of which are shown in Fig. 7; and to each of the brackets is pivotally connected by a pin 16, one arm 17 of a three armed yoke 18, each of the arms 17 of the yoke being slidably mounted in a sleeved bracket 19 secured to a vertical strut 20 connecting the upper and lower longerons 21 and 22 respectively, at one side of the fuselage F.

The center arm of the yoke is extended to provide a rod 23 slidably mounted in a barrel L secured by brackets 24 to a transverse strut 25 connecting the struts 20 and 20$^a$, (Fig. 2) and within the barrel L is threaded a sleeve 26 having one end closed and its other end open and closed by a removable plug 27 through which the rod extends into the sleeve. The free end of the rod 23 is provided with a head 28, and surrounding the rod between its head and the plug 27, is a coil spring 29 which normally urges the rod inwardly of the sleeve, and through the medium of the yoke 18 urges the rear extremity of the braking element B towards the side wall 14 of the fuselage and thus yieldingly maintains the rear extremity of the pocket 15 closed.

The braking elements B and B' are adapted to be manually actuated simultaneously to occupy either the inactive position shown in Fig. 2 or the active position shown in Fig. 3, and in the present instance, the means for actuating the braking elements comprises a pair of yokes 30 and 30$^a$, provided respectively with three parallel arms 31 and 31$^a$ extending respectively through sleeved brackets 32 and 32$^a$ secured respectively to vertical struts 33 and 33$^a$ connecting the upper and lower longerons of the fuselage, the free ends of the arms 31 and 31$^a$ being pivotally connected by pins 34 and 34$^a$ respectively to brackets 35 and 35$^a$ respectively, secured at points one above the other to the forward extremities of the vertical panels 10 of the braking elements B and B' as shown in Figs. 2 and 6.

The center arms of the arms 31 and 31$^a$ are extended to provide rods 36 and 36$^a$ respectively, having angularly disposed extremities provided with spherical heads 37 and 37$^a$ respectively, slidably received in angularly disposed grooves 38 and 38$^a$ respectively formed in a cam plate 39 mounted for sliding movement in a fore and aft direction by means of a pair of rods 40 secured to the underside of the cam plate by means of brackets 41 and slidable in sleeved brackets 42 secured to a transverse strut 43 connecting the vertical struts 33 and 33$^a$.

To the cam plate 39 is pivotally connected one end of a link 44, the opposite end of which is pivotally connected to a crank 45 formed on a rock shaft 46 journaled in bearings 47, secured to the vertical struts 20 and 20$^a$.

To the shaft 46 is fixed a hand lever 48 by means of which the shaft 46 is adapted to be manually rocked by the pilot in the cockpit C, to move the cam plate 39 forwardly or rearwardly; and through the co-action between the cam grooves 38 and 38$^a$ and the heads 37 and 37$^a$, to accordingly simultaneously move the braking elements B and B' to the inactive position shown in Fig. 2 or the active position shown in Fig. 3.

The lever 48 is adapted to be latched against movement to maintain the braking elements in any one of a plurality of intermediate positions by means of a spring latch comprising a pawl 50 pivoted on the lever and normally urged by a spring 51 into engagement with teeth 52 of a stationary segment 53. The pawl is adapted to be moved out of engagement with the teeth, to release the lever, by means of a rod 54 pivotally connected to the pawl and to a short lever 55 pivoted on the hand lever 48 and adapted to be actuated by the pilot in the act of gripping the hand lever to actuate the latter.

The operation of the device is as follows:

With the braking elements B and B' latched in the inactive position shown in Fig. 2, let it be assumed that the aircraft is in flight and that the pilot desires to make a landing. The hand lever 48 is grasped and unlatched, after which it is moved forwardly, thus causing the braking elements to be moved outwardly about the pins 16 and 16$^a$ as pivots, towards the active position shown in Fig. 3.

It will be appreciated that upon the initiation of the movement of the braking elements to active position, the pressure of the air through which the aircraft is traveling, will act against the inner sides of the elements to complete the movement thereof to active position, this movement of the elements being definitely limited by means of stop lips 56 and 57 formed on the free edges of the flanges 11 and 12 respectively of the panels 10, which are adapted to abut the side walls 14 of the fuselage. In order to retard the movement of, and cushion the elements against excessive stresses incident to the movement thereof to active position under the action of the air, the arms 31 and 31$^a$ of the yokes 30 and 30$^a$ respectively are provided with coil springs 58 and 58$^a$ respectively which are compressed as the braking elements move outwardly, to thus retard the movement of the elements and cushion the sudden stop of the elements upon reaching active position.

With the braking elements occupying their active position, it will be clear that they will form abutments and that the pockets P formed by the co-operation of the elements and side walls of the fuselage, will operate to trap air through which the craft is traveling so that the movement of the craft through the air will be resisted and checked to such extent that the braking effect upon the craft will result in its being brought to a stop in a relatively short distance of travel, thus permitting the craft to be landed in a restricted area.

It will be noted that the location of the braking elements on the fuselage, with respect to the center of gravity of the aircraft, is such that the pressure of the air acting against the pockets P will automatically maintain the craft in a state of fore and aft balance, as the forward portion of the pockets is in advance of the center of gravity, while the rear portion of the pockets is behind the center of gravity to such extent that the tail of the aircraft will be depressed sufficiently to cause the craft to assume and maintain a normal landing position, thus greatly facilitating the landing operation.

Should the speed at which the craft is traveling when the braking elements are moved to active position, be too high to permit the braking action of the elements upon the aircraft to be effected with safety, the pressure of the air trapped within the pockets P will act against the elements to move the rear extremities thereof outwardly from the fuselage, against the normal action of the springs 29 and 29ª in the barrels B and B' respectively, thus opening the formerly closed rear ends of the pockets so that the air will be free to pass through the pockets and be ineffective to check the speed of the craft, all of which is clearly shown in Fig. 4.

However, as the speed of the craft is decreased sufficiently by the pilot, the springs 29 and 29ª will gradually overcome the correspondingly decreasing air pressure acting against the elements, so that the latter will be gradually moved inwardly of the fuselage to close the rear ends of the pockets, thus gradually increasing the braking action until a maximum braking action is reached when the rear ends of the pockets are fully closed.

The speed of the aircraft will thus be smoothly checked and with such effectiveness that the craft will be brought safely to rest in a relatively short distance of travel, so that the dangers of landing on terrain offering only restricted areas where a safe landing can be effected, will be reduced to a minimum.

To compensate for aircraft having different landing speeds, the tension of the springs 29 and 29ª can be varied to accordingly vary the pressure of air against the braking elements required to move the rear extremities of the latter outwardly from the fuselage and thus relieve the pressure of air from the pockets. This adjustment can be effected by merely rotating the sleeves 26 and 26ª inwardly or outwardly of the respective barrels B or B', to accordingly increase or decrease the normal urging force of the springs, the sleeves being latched against accidental rotary movement by means of spring arms 59 and 59ª fixed to the sleeves and engaging teeth 60 and 60ª formed respectively on the barrels L and L' (Fig. 7).

When the craft has been brought to a stop it is only necessary for the pilot to grasp the hand lever 48 and pull it rearwardly, thus causing the braking elements to be moved inwardly to their inactive positions in which they will be latched upon releasing of the lever.

Although I have herein shown and described only one form of braking device for aircraft embodying my invention, it is to be understood that various changes and modifications may be made therein without departing from the spirit of the invention and the spirit and scope of the appended claims.

I claim:

1. In combination, an aircraft, and a braking device for the aircraft comprising means mounted for movement on the aircraft to occupy an inactive position and an active position wherein it presents to the air through which the aircraft travels when in motion, an abutment offering resistance to the passage of the air, to thereby produce a braking effect upon the aircraft to check the speed thereof, manually operable means for actuating the first means, and means operable in response to pressure of the air against said surface in abutment of a predetermined pressure, to render the abutment to move under the action of the air to a position wherein it will be ineffective to resist passage of the air, whereby sudden checking of the speed of the aircraft will be prevented.

2. In combination, an aircraft, and a braking device for the aircraft comprising means forming an abutment on the aircraft responsive to the action of the air through which the aircraft travels when in motion, to check the speed of the aircraft, whereby braking of the aircraft will be effected, and means operable automatically at a speed of the airplane in excess of a predetermined speed, to render the first means ineffective and thereby prevent sudden checking of the speed of the aircraft.

3. In combination, an aircraft fuselage, and a braking device for the aircraft comprising braking elements mounted for movement on the fuselage to occupy an inactive position wherein they are contiguous to the sides of the fuselage, and an active position wherein they project from the sides of the fuselage to co-operate with the latter in forming forwardly opening pockets to trap air through which the aircraft travels when in motion, and thereby check the speed of the aircraft, means for actuating the braking elements, and means operable in response to air pressure created in the pockets in excess of a predetermined pressure, to render the braking elements free to move under the action of the air to a position wherein the air will be free to pass through the pockets and thereby prevent sudden checking of the speed of the aircraft.

4. A braking device for aircraft comprising wing members, means by which the members are adapted to be mounted for movement on the fuselage of the aircraft for movement to occupy an inactive position wherein the members are contiguous to the fuselage, and an active position wherein the members co-operate with the sides of the fuselage to form forwardly opening pockets in which air through which the aircraft travels when in motion, is adapted to be trapped and thereby check the speed of the aircraft, means for actuating the members, means for mounting the first means for movement to move the members in a manner to open or close the rear end of the pockets, and means for normally urging the last means to a position wherein the rear ends of the pockets are closed, yet being ineffective when a predetermined pressure upon the air trapped in the pockets is created so that the last means is free to move to a position wherein the rear end of the pockets will be opened, whereby the air will be free to pass through the pockets for the purpose described.

5. A braking device for aircraft comprising wing members, means by which the members are adapted to be mounted for movement on the fuselage of the aircraft to occupy one position wherein the members are inactive, a second position wherein the members are adapted to co-operate with the fuselage to form air trapping pockets open at the forward extremity of the members and closed at the rear extremity thereof, and a third position wherein the pockets are open at both the forward and rear extremities of the members so that air is free to pass through the pockets, means for actuating the members, and automatically operable means whereby the members will be rendered free to move to the third mentioned position when a predetermined pressure of air is created in the pockets.

6. A braking device for aircraft comprising wing-members, means by which the members are adapted to be mounted for movement on the fuselage of the aircraft to occupy one position wherein the members are inactive, a second position wherein the members are adapted to co-operate with the fuselage to form air trapping pockets open at the forward extremity of the members and closed at the rear extremity thereof, and a third position wherein the pockets are open at both the forward and rear extremities of the members so that air is free to pass through the pockets, actuating means for the members, and means for normally urging the members to close the pockets at the rear extremities of the members, yet yieldable when the pressure of air trapped in the pockets increases beyond a predetermined maximum so that the members will be free to move to the third mentioned position to permit the air to pass through the pockets.

7. A braking device for aircraft comprising a pair of wing members, means for pivotally mounting the members of the rear extremities thereof on the opposite sides of an aircraft fuselage to occupy a folded position wherein the members are contiguous to the sides of the fuselage, and an extended position wherein the members co-operate with the sides of the fuselage to form wedge shaped air trapping pockets open at the forward extremities of the members and closed at the rear extremities of the members, and manually operable means for simultaneously actuating the members comprising slidably mounted arms operatively connected to the wing members, a slidable cam engaging the arms for reciprocating the latter to move the members to folded and extended positions, a rock shaft having a crank arm, a link connected to the cam and crank arm, a manually operable lever fixed to the shaft, and means for latching the lever in any one of a plurality of positions.

8. A braking device for aircraft comprising a pair of wing members, means for pivotally mounting the members at the rear extremities thereof, on the opposite sides of an aircraft fuselage to occupy a folded position wherein the members are contiguous to the sides of the fuselage, and an extended position wherein the members co-operate with the sides of the fuselage to form wedge shaped air trapping pockets open at the forward extremities of the members and closed at the rear extremities of the members, manually operable means for actuating the members, means for mounting the first means for movement to move the rear extremities of the members towards or away from the fuselage and accordingly close or open the pockets at the rear extremities of the members, and yieldable means for normally urging the last means to a position wherein the pockets at the rear extremities of the members will be closed.

9. A braking device for aircraft comprising a pair of wing members, means for pivotally mounting the members at the rear extremities thereof, on the opposite sides of an aircraft fuselage to occupy a folded position wherein the members are contiguous to the sides of the fuselage, and an extended position wherein the members co-operate with the sides of the fuselage to form wedge shaped air trapping pockets open at the forward extremities of the members and closed at the rear extremities of the members, manually operable means for actuating the members, means for mounting the first means for movement to move the rear extremities of the members towards or away from the fuselage and accordingly close or open the pockets at the rear extremities of the members, comprising fixed barrels, rods slidably mounted in the barrels and pivotally connected to the members, and springs in the barrels for normally urging the rods to the extreme position wherein the pockets at the rear extremities of the members will be closed, the springs being of such tension as to yield to a predetermined pressure of air created in the pockets when the members occupy extended position so as to permit the rods to move to their other extreme position and thereby open the pockets at the rear extremities of the members so that the air is free to pass through the pockets.

10. A braking device for aircraft comprising a pair of wing members, means for pivotally mounting the members at the rear extremities thereof, on the opposite sides of an aircraft fuselage to occupy a folded position wherein the members are contiguous to the sides of the fuselage, and an extended position wherein the members co-operate with the sides of the fuselage to form wedge shaped air trapping pockets open at the forward extremities of the members and closed at the rear extremities of the members, manually operable means for actuating the members, means for mounting the first means for movement to move the rear extremities of the members towards or away from the fuselage and accordingly close or open the pockets at the rear extremities of the members, comprising fixed barrels, rods slidably mounted in the barrels and pivotally connected to the members, springs in the barrels for normally urging the rods to the extreme position wherein the pockets at the rear extremities of the members will be closed, the springs being of such tension as to yield to a predetermined pressure of air created in the pockets when the members occupy extended position so as to permit the rods to move to their other extreme position and thereby open the pockets at the rear extremities of the members so that the air is free to pass through the pockets, and means by which the tension of the springs can be varied.

11. A braking device for aircraft comprising means defining a pocket so situated on the craft that when the latter is in motion air will be forced into the pocket to set up a counter pressure of air therein operating to produce a braking action upon the craft, and means for relieving the counter pressure of air in the pocket only when a predetermined air pressure exists in the pocket, to thereby reduce the braking action.

12. A braking device for aircraft comprising means defining a pocket so situated on the craft that when the latter is in motion air will be forced into the pocket to set up a counter pressure of air therein operating to produce a braking action upon the craft, and automatic means for relieving the counter pressure of air in the pocket when a predetermined air pressure exists in the pocket, to thereby reduce the braking action.

13. A braking device for aircraft comprising means defining a pocket having an inlet, an outlet, and a movable member controlling the outlet, yieldable means normally acting to maintain said member in a position wherein the outlet is closed so that air forced through the inlet when the craft is in motion will set up a counter pressure of air in the pocket operating to produce a braking action upon the craft, said last means yielding in response to a predetermined counter pressure of air against said member to permit the latter to move to a position wherein the outlet will be open so that air will be free to escape from the pocket through the outlet and thereby reduce the braking action.

14. A braking device for aircraft comprising means defining a pocket having an inlet and a normally closed outlet, with the inlet so disposed on the craft that when the latter is in motion air will be forced through the inlet to set up a counter pressure of air in the pocket operating to produce a braking action upon the craft, and automatic means for opening the outlet to relieve the pressure of air in the pocket and thereby reduce the braking action.

15. A braking device for aircraft comprising means defining a pocket having an inlet and a normally closed outlet, with the inlet so disposed on the craft that when the latter is in motion air will be forced through the inlet to set up a counter pressure of air in the pocket operating to produce a braking action upon the craft, and means for automatically opening the outlet in response to a predetermined pressure of air in the pocket, to thereby relieve the air pressure and reduce the braking action thereof.

Signed at El Centro in the county of Imperial and State of California this 28th day of May, one thousand nine hundred twenty eight.

MARION H. ATEN.